Nov. 28, 1967 W. MOLL 3,354,500
APPARATUS FOR THE PRODUCTION OF NEGATIVES BY MECHANICAL MEANS
Filed Feb. 2, 1966 3 Sheets-Sheet 1

INVENTOR.
Werner Moll
BY Ernest F. Montague
Attorney

Nov. 28, 1967 W. MOLL 3,354,500
APPARATUS FOR THE PRODUCTION OF NEGATIVES BY MECHANICAL MEANS
Filed Feb. 2, 1966 3 Sheets-Sheet 3

INVENTOR.
Werner Moll
BY
Ernest G Montague
attorney

United States Patent Office 3,354,500
Patented Nov. 28, 1967

3,354,500
APPARATUS FOR THE PRODUCTION OF NEGATIVES BY MECHANICAL MEANS
Werner Moll, Solingen-Wald, Germany, assignor to Firma Werner Moll, Solingen-Wald, Germany, a corporation of Germany
Filed Feb. 2, 1966, Ser. No. 524,525
Claims priority, application Germany, Feb. 5, 1965, M 64,078
3 Claims. (Cl. 18—1)

ABSTRACT OF THE DISCLOSURE

An apparatus for the production of negatives by mechanical means which comprises a housing and a base plate. A cut is supported by the base plate and supports a film on its top. Means are also provided for subjecting the base plate to a swinging movement and a plurality of balls are disposed above the cut and sense the base plate for the swinging movement. These means comprise a drive shaft which is rotatably mounted within the housing and includes eccentric shaft ends at both ends of the shaft. Eccentric bushings receive the shaft ends and are releasably secureable against rotation in any one of a plurality of adjusting positions. Finally, a bearing supports the bushings and is suspended by a buttstrap means which is operatively connected with the base plate.

---

The present invention relates to an apparatus for the production of negatives by mechanical means.

Apparatus for the production of negatives by mechanical means have been known, as so-called "clarifiers," in which balls are provided above a typographic cut or the like and above a film disposed thereat, which balls sense the typographic cut or the like by means of a base plate carrying the typographic cut or the like and the film due to a swinging movement of the base plate, which swinging movement is obtained by an eccentric control. The uniformity of the swinging movement of the base plate is of great importance to obtain satisfactory negatives. The required uniformity of a plane parallel swinging movement of the base plate can be maintained, however, in this apparatus only with difficulty, particularly, when in accommodation with the prevailing character of a typographic cut, an adjustment of the eccentric is required for obtaining differently large amplitudes. A corresponding adjustment could not be obtained until now in such an apparatus in accommodation to a desirable working method.

It is therefore one object of the present invention to provide an apparatus for the production of negatives from mechanical means wherein the apparatus is designed such, that both the eccentric bushings, relative to which the driving shaft is adjustable, are secured in a predetermined angular position.

By this arrangement it is in accordance with the present invention of advantage, when each of the two eccentric bushings, sitting on an eccentric shaft end of the drive shaft, has a disc-shaped flange which is equipped with an entrance opening for a securing bolt sitting in the housing wall and operable from the outside.

It is another object of the present invention to provide an apparatus for the production of negatives from mechanical means wherein the housing wall has an opening therethrough, disposed axially on the level of the drive shaft for insertion of an adjustment key engaging the free end of the drive shaft.

It is still another object of the present invention to provide an apparatus for the production of negatives by mechanical means, wherein the latter opening is framed by a scale and the adjustment key has a scale indicator cooperating therewith.

Due to such arrangement an apparatus is created which is advantageous as to its manufacture as well as to its operation. In particular due to the fact that both eccentric bushings are fixed during the adjustment process in a predetermined angular position by the securing bolts inserted into the entrance openings of the flanges of the bushings, it is brought about, that in order to obtain a different knocking intensity, a forced uniform and exact adjustment of the amplitude is achieved. The actual adjustment procedure is thereby limited to merely one adjustment member, namely the drive shaft, the shaft ends of which secured at both ends thereto carry corresponding eccentric pins. The uniform adjustment of the eccentric brings about a high plane parallel arrangement of the swinging amplitudes of the base plate. Due to the fact that the same adjustment takes place for both eccentrics, an inclination of the base plate is safely prevented. It is accordingly also avoided, that the balls collect at lower positions possibly created thereby, and rather a uniform loose distribution of the balls takes place, so that the latter sense equally the typographic cut or the like. High quality negative films are obtainable, since the apparatus permits an exact accommodation to the prevailing type of the typographic cut concerning the knocking strength and, in particular, also under consideration of greater neutral, that means hollow disposed points.

With these and other objects in view which will become apparent in the following detailed description, the present invention will be clearly understood in connection with the accompanying drawings in which.

Figure 1:
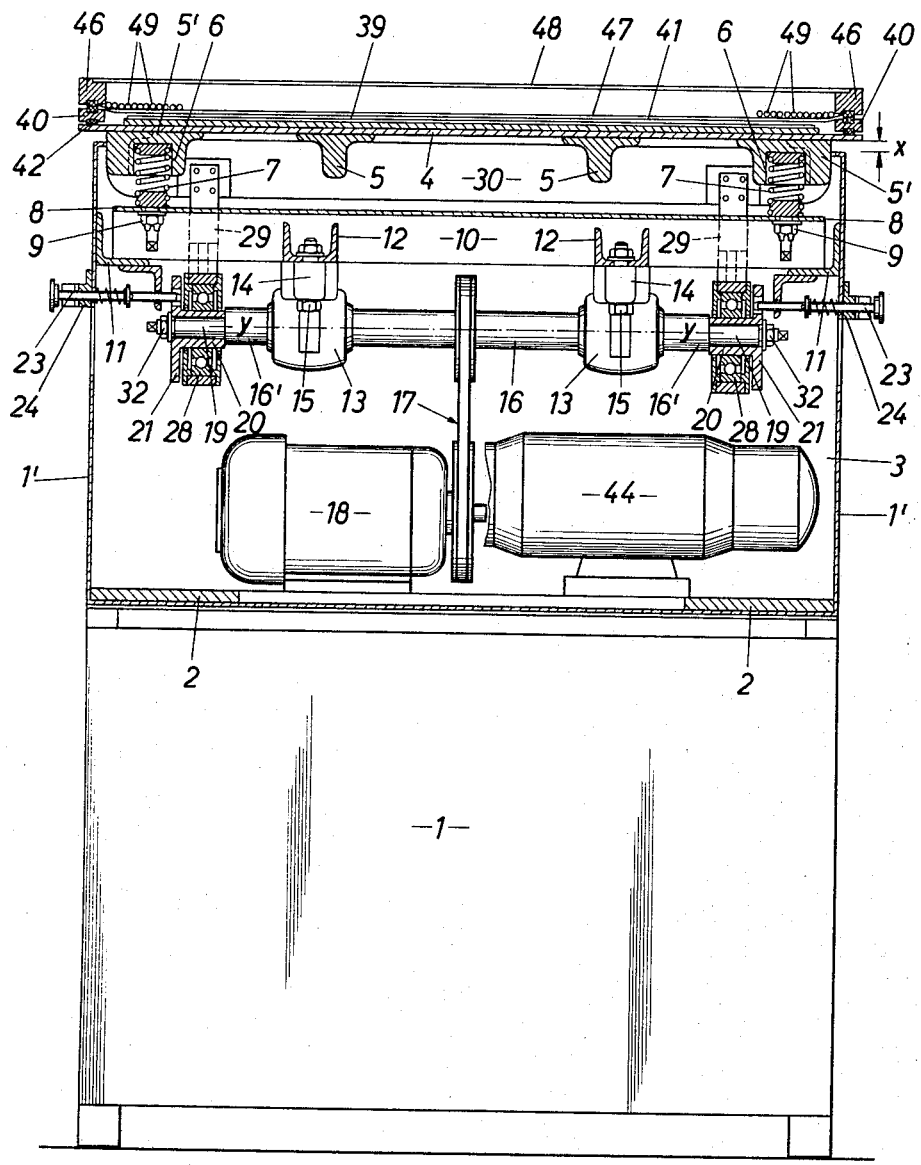
FIGURE 1 is a vertical section of the apparatus designed in accordance with the present invention for the production of negative films in connection with the eccentric bushings showing the apparatus in inoperative position ready for insertion of the adjusting key for adjustment.

Referring now to the drawings, the apparatus for the production of negatives, for instance, by the use of conversion films, has a cabinet-like box part 1 which divides the space 3 an intermediate bottom 2 for the reception therein of a driving means for moving a base plate 4.

The base plate 4 is disposed above the edge 1' of the box part 1 at a distance $x$ and is stabilized by means of a plurality of stiffening ribs 5 against a torsion effect. The stiffening frame 5', arranged adjacent the edge of the base plate 4, has in all four corners a blind bore 6. The free ends of helical pressure springs 7 enter the blind bores 6. The helical pressure springs 7 form a support for the pressure plate 4 and engage at their lower ends corresponding consoles 8, the latter being rigid as to the housing. The lower end windings of these springs 7 are secured to adjusting means 9, in order to make possible a variation of the force of the springs 7.

Angular rails 10 forming the consoles 8 rest in turn on angular rails 11 disposed crosswise to the rails 10, which rails 11 are secured to the walls 1' of the box housing, for instance by welding or riveting.

Corresponding to the angular rails 11 U-shaped rails 12 extending through the housing space 3, each carrying a shaft bearing 13. The shaft bearings 13 have flanges 14, which make possible a stable and rigid arrangement as to the housing by means of securing screws 15.

The shaft bearings 13 receive a drive shaft 16 which is driven by means of a belt drive 17 from an electric driving motor 18.

Both shaft ends 16' are each extended for a length z by a shaft end 19 rigidly extending therefrom. The latter are of smaller diameter than the drive shaft 16 and in addition they are eccentrically disposed relative to the center axis y—y of the latter.

Eccentric bushings 20 are mounted on both shaft ends 19. Each of these eccentric bushings 20 has a disc-like flange 21. The flanges 21 face towards the side walls 1' and are equipped with an entrance opening 22 as may more readily be seen in FIG. 2.

The entrance openings 22 serve the purpose of inserting therein a securing bolt 23 which is operated and controlled from the outside. The securing bolts 23 are uniformly designed. They are mounted and aligned axially in the housing wall 1'. A bushing 24, as well as an angular member 26, serves as their mounting and guiding means, and the angular member 26 has a guide bore 25 through which the bolts 23 extend. A spring 27 is compressed between the bushing 24 and an annular flange portion of the securing bolts 23 so that the latter can be withdrawn against the force of the spring 27 for removal away from and out of the openings 22. The securing bolts 23 are locked in such removed position during operation of the apparatus by rotating the bolts 23 so that guide pins 23a secured thereto leave the pin slots 24a in the bushing 24 and are held against the free end 24b of the bushing 24 away from the openings 22.

The two eccentric bushings 20 are surrounded by ball bearings 28. Buttstraps 29, for instance made of spring blade steel, extend directly upwardly from the ball bearings 28. The buttstraps 29 are connected at their upper ends with a strut 30 (FIG. 1), which strut 30 forms a single structural unit together with the base plate 4. In this manner an eccentric movement of shaft ends 19 and eccentric bushings 20, produced by a rotation of the drive shaft 16, is transformed into vibrations of the base plate 4.

Figure 4:
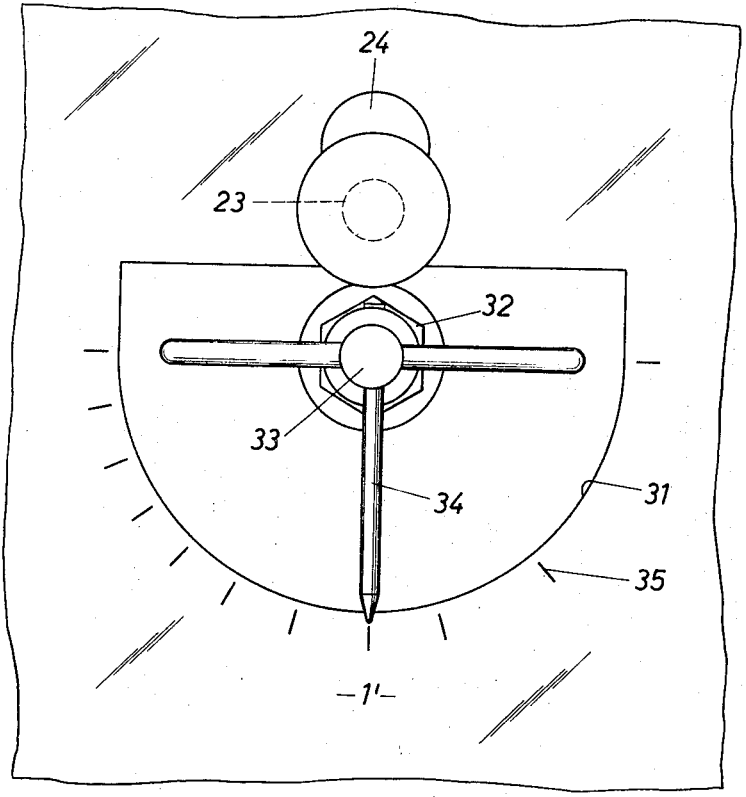
FIG. 4 is a fragmentary end view of one of the two securing devices showing the adjustment key in position for adjustment and the scale and scale indicator features thereof.

Axially of the drive shaft 16 in both directions the housing walls 1' are equipped with a drive shaft opening 31. During adjustment periods, when the apparatus is in its inoperative state, the opening 31 serves, on the one hand, for the introduction of a tubular key for the release of the lock nut 32, and, on the other hand, for the insertion of an adjusting key 33 (FIG. 2) engaging the free end of the shaft end 19. The adjusting key 33 is formed as a type of a box spanner and has a scale indicator 34 disposed perpendicularly to the shaft of the key, which scale indicator 34 has coordinated thereto a scale 35. The latter is disposed adjacent the edge of the entrance opening 31 (FIG. 4). The previous setting value is readable by provision of a recessed square 36 secured to the shaft end 19 and by a grip pin 37, which enters a corresponding grip slot 38 of the adjusting key 33, thereby permitting one to start with an indication of the previous setting when one is ready to adjust the eccentricity of shaft ends 19 to a new value.

Figure 3:
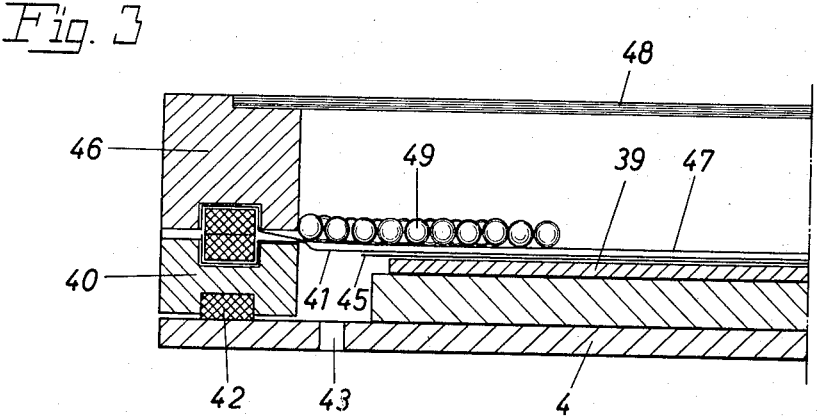
FIG. 3 is an enlarged section of the left upper frame edge of the apparatus.

The base plate 4 serves the purpose of receiving a flat typographic cut 39 (FIGS. 1 and 3), which can comprise by example, a print-ready photopolymer block. The typographic cut 39 is covered by a vacuum frame 40 hinged to the base plate 4, which vacuum frame 40 is closed at its upper side by an exchangeable foil 41. At the bottom of the vacuum frame 40 is disposed a set-in and annular centering spigot 42, which centering spigot 42 engages the smooth face base plate 4. The inner space of the vacuum frame 40 communicates through one or a plurality of openings 43 with a vacuum generating means 44. The typographic cut 39 is incidentally so far supported, that its upper side, that is, its printing face, extends nearly into the range of the foil 41. The foil 41 fixes the film mounted on the printing face in position, which film constitutes a negative 45. Further individually formed parts, as for instance a sentence, can likewise be transmitted to the film.

A second so-called ball frame 46 is arranged directly above the vacuum frame 40. The ball frame 46 is likewise capable of being raised and is connected by a hinge for this purpose. Between two foils 47 and 48 of this frame 46 are disposed a plurality of steel-or lead-balls 49. Due to the vibrations exerted upon the base plate 4, these balls 49 sense the typographical cut through the film, whereby the face structure of the typographical cut is imaged on the conversion film.

Figure 2:
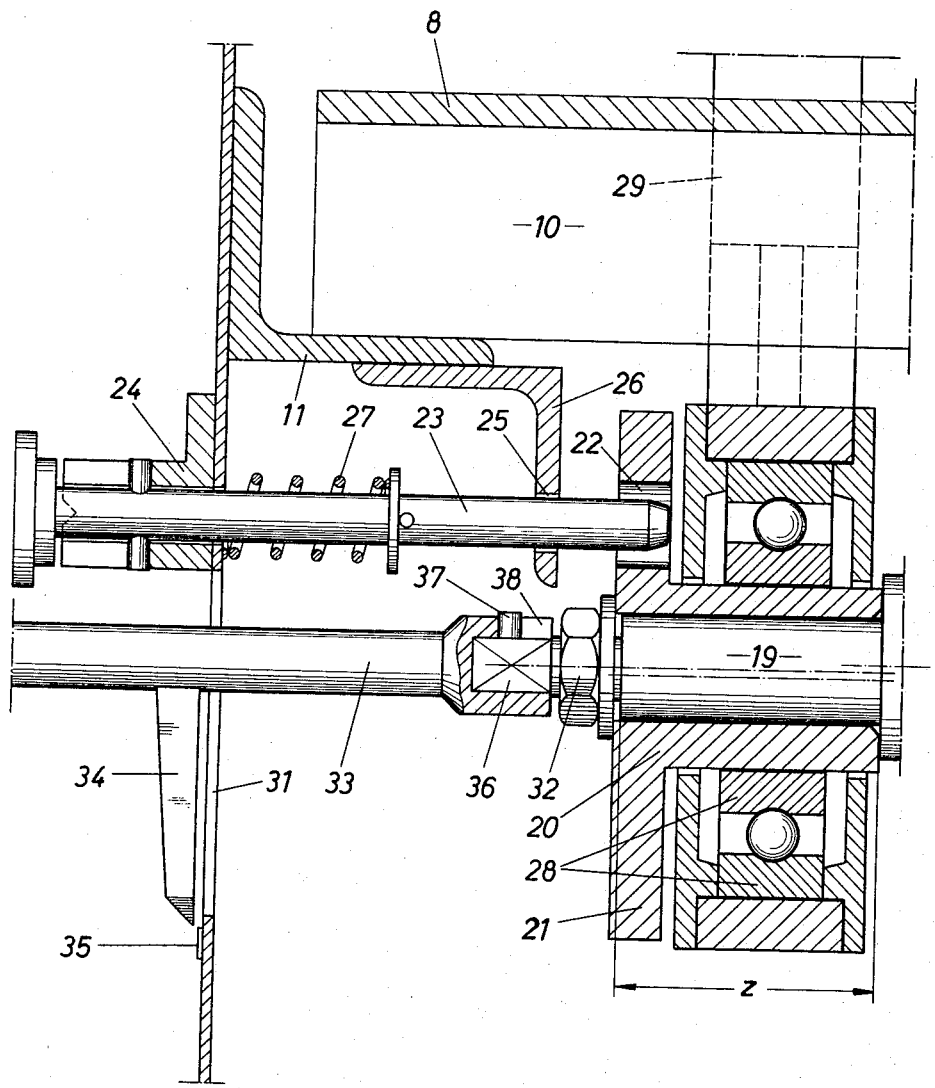
FIG. 2 is an enlarged fragmentary section of one of the two securing devices of the apparatus showing the adjustment key in position during adjustment.

To adjust or change the amplitude of the swinging movement, amounting in the present case to an adjustment of the eccentric, the following steps are taken:

The electric driving motor 18 is stopped. Thereupon the drive shaft 16 is turned manually into a position such that the openings 22 are aligned with the securing bolts 23, which permits the securing bolts 23 to enter into the openings 22 of the two eccentric bushings 20. The latter are thereby secured, upon insertion of these bolts 23, in exact equal angular positions and are non-rotatable, which provides the corresponding equal adjustment of both bushings 20 by a simple turning adjustment of the drive shaft by adjusting element 33, in accordance with the present invention. The lock nuts 32 holding the bushings 20 are then released. The adjusting key 33 is then inserted through opening 31 (FIG. 2) and the drive shaft 16 can now be adjusted by turning the desired amount, that is, in the direction of an enlargement or reduction of the eccentricity, with a simultaneous reading of the measuring value by the scale indicator 34 on the scale 35 (FIGS. 2 and 4). The adjustment of the drive shaft 16 can be performed from the side of the box housing 1, which is most suitable for this purpose. For both eccentrics, the same adjustment degree is obtained upon rotation of the drive shaft 16. After the adjustment, the lock nuts 32 are again tightened and the adjusting bolts 33 are removed thereafter from their adjusting position, and the securing bolts 23 are removed from the opening 22. The apparatus is now again ready for operation.

While I have disclosed one embodiment of the invention, it is to be understood that this embodiment is given by example only and not in a limiting sense, the scope of the present invention being determined by the objects and the claims.

I claim:

1. An apparatus for the production of negatives by mechanical means, comprising
   a housing,
   a base plate,
   a cut supported by said base plate,
   said cut being adapted to support a film on its top,
   means for subjecting said base plate to a swinging movement,
   a plurality of balls disposed above said cut and sensing said base plate by said swinging movement,
   said means comprising a drive shaft rotatably mounted within said housing and including eccentric shaft ends at both ends of said shaft,
   eccentric bushings receiving said shaft ends and releasably securable against rotation,
   means for securing both said eccentric bushings in any one of a plurality of adjusting positions, and
   a bearing supporting said bushings and suspended by a buttstrap means operatively connected with said base plate.

2. The apparatus, as set forth in claim 1, wherein said securing means for said eccentric bushinsg comprises a disc-like flange having an entrance opening, and a bolt axially movable in said housing adjacent to said flange and operable from the outside of said housing for releasable locking insertion of said bolt into said entrance opening, when said apparatus is in inoperative position for rotatably adjusting said drive shaft.

3. The apparatus, as set forth in claim 2, wherein the wall of said housing has an opening aligned with the longitudinal axis of said drive shaft, and which comprises an adjusting key engaging the free end of said shaft end, a scale disposed at the edge formation of said opening, and said adjusting key includes a scale indicator.

References Cited
UNITED STATES PATENTS

| | | | |
|---|---|---|---|
| 2,106,329 | 1/1938 | Scott | 25—41 |
| 3,188,687 | 6/1965 | Blair | 18—1 |
| 3,243,843 | 4/1966 | Halpren | 18—1 |

WILLIAM J. STEPHENSON, *Primary Examiner.*